Figure 1:
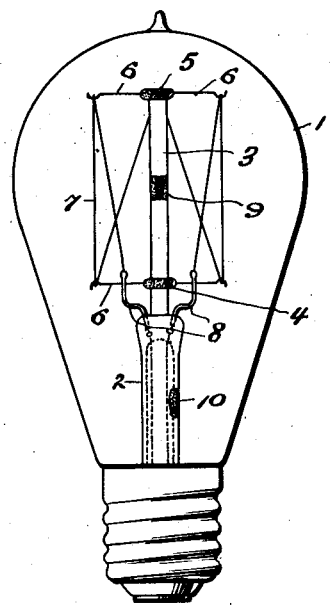

Feb. 16, 1926.

C. T. FULLER 1,573,601

ARTICLE CONTAINING VISIBLE TEMPERATURE RECORDS AND METHOD
OF OBTAINING THE RECORDS

Filed Jan. 26, 1922

Inventor:
Carl T. Fuller.
by Albert E. Davis
His Attorney.

Patented Feb. 16, 1926.

1,573,601

UNITED STATES PATENT OFFICE.

CARL T. FULLER, OF NUTLEY, NEW JERSEY, ASSIGNOR TO GENERAL ELECTRIC COMPANY, A CORPORATION OF NEW YORK.

ARTICLE CONTAINING VISIBLE TEMPERATURE RECORDS AND METHOD OF OBTAINING THE RECORDS.

Application filed January 26, 1922. Serial No. 532,047.

*To all whom it may concern:*

Be it known that I, CARL T. FULLER, a citizen of the United States, residing at Nutley, county of Essex, State of New Jersey, have invented certain new and useful Improvements in Articles Containing Visible Temperature Records and Methods of Obtaining the Records, of which the following is a specification.

My invention relates to the manufacture of articles such as incandescent electric lamps and similar articles which are heated at some stage of their manufacture to a predetermined temperature, and more particularly to a method of obtaining a permanent visible record of whether the article or any selected part of it has been subjected to a predetermined temperature.

To obtain the best results various kinds of articles must be heated at certain stages in their manufacture, and upon the accuracy with which they are heated to a definite temperature depends to a large extent the quality of the article. This is particularly true in the case of incandescent electric lamps and similar evacuated devices, which are heated during exhaust. When the lamp is manufactured in the usual way its quality is very greatly lowered by failure to heat all its interior parts above a definite temperature during exhaust. Overheating also results in an inferior product. Heretofore no practical method has been available to show whether the interior parts had been properly heated, and the product has therefore been variable in quality.

One object of my invention is to provide a simple and inexpensive method by means of which it is possible to determine by mere inspection of the article or lamp itself whether a lamp was heated to a high enough temperature during exhaust. Another object is to provide a method of determining by mere inspection whether the lamp has been overheated or underheated. Still another object is to produce an incandescent lamp or similar article which contains a permanent visible record of whether it has been heated to a predetermined temperature during its manufacture. Further objects and advantages of my invention will hereinafter appear.

In accordance with my invention I apply to some essential part of the article an indicator which will by its appearance or color show whether that part has been heated to a definite temperature. This indicator is preferably some coloring material which at said temperature permanently changes its color in a striking manner, or becomes practically colorless. To show whether the heating of the article has been kept within a certain temperature range I may use two or more indicators, one affected at the minimum temperature and another at the maximum temperature. It is then obvious on inspection that if both these indicators are affected the article has been overheated; if neither is affected it has been underheated; and if one is affected and the other is not its temperature has been kept within the proper range. The coloring materials I prefer to use are organic dyes which change or decompose at the selected temperatures with a marked change in appearance. Where two or more indicators are used I may mix them provided they do not react with each other, and apply the mixture to the part of which the temperature is significant. Some of these dyes are water soluble, and others are soluble in alcohol, and where possible I prefer to apply them in the form of a solution as by painting the solution on the selected part. The dyes with which I have obtained the best results in lamp making are those dyes of the triphenyl methane group which undergo a permanent change or loss of color when subjected for a suitable time interval to temperature of 150° C. to 310° C., although a similar action occurs in some dyes of the diphenyl methane group, such as the dye known as auramine yellow, which is permanently changed at about 250° C. Some other dyes, such as the azo dye known as spirit scarlet, may also be used as it disappears at a temperature of about 180° C., although this dye does not seem to break down, but to sublime at that temperature. Since time is also a factor in the fading of dyes the temperatures above given at which these dyes change or fade will be correct only when the heating is comparatively rapid, as for example, when the given temperature is attained in from two to three minutes. If the heating is slower the dyes may fade at somewhat lower temperatures.

Figure 2:
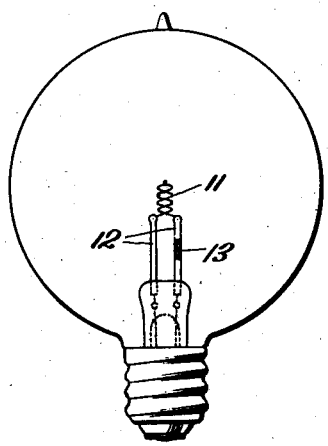

The best mode which I at present know of practicing my invention in connection with incandescent lamps and similar articles may be understood by reference to the accompanying drawing, in which Figure 1 is a view of a lamp made in accordance with my invention with the indicator applied to certain interior parts of glass, and Figure 2 shows how it may be applied to interior parts of metal as well.

The lamp shown in Figure 1 is of a common type comprising a bulb 1 with a glass stem 2 from which extends a glass hub or rod 3 having buttons 4 and 5 in which are embedded the inner ends of anchors 6 on which is strung or supported the filament 7. The lead wires 8 connected to the ends of the filament supply the current.

In accordance with my invention I obtain a visible permanent record of whether the inner glass parts of the lamp were properly heated during exhaust by applying to those parts an indicator which permanently changes when the glass part attains a predetermined temperature. The indicator may be applied to one or both buttons 4 and 5, and to the hub or rod 3, as shown at 9, or to the stem, as shown at 10. Usually it is sufficient to apply the indicator to one significant part, such as the button 5, the temperature of which is usually a reliable indication of the temperature of the other parts. If, for example, I use on the button 5 as an indicator an alcohol solution of the green triphenyl methane dye known as malachite green, which becomes practically colorless at about 220° C., a green button shows that the lamp was not heated enough to raise the button to 220° C., while a colorless button shows that it was heated enough to raise the button above that temperature. Methyl violet, another tri-phenol methane dye which fades permanently at about 250° C., may also be used. For higher temperatures I have used successfully the tri-phenyl methane dyes commercially known as Chemco red, which changes at about 280° C., and Chemco blue, which is not affected until a temperature of about 310° C. is reached. By the use of these indicators I can obtain a lamp which has some part, such as the button 5, or the hub 3 at the point 9, or the stem 2 at the point 10, on which there is a permanent easily visible record of whether that particular part ever attained at that point a predetermined temperature. The advantages of this permanent record in the lamp itself are many. Whenever for any reason, such as failure of gas pressure on the burners, or faulty adjustment of the burners, the lamps being made are not being heated to the proper temperature, that fact becomes apparent instantly and the operator can immediately make the necessary corrections. The inspector can easily detect the lamps which were not properly heated during exhaust, and the consumer can tell by inspection whether the lamp offered him was heated as it should have been.

For some reasons it is desirable to avoid overheating as well as underheating and therefore in accordance with my invention I obtain a suitable indicator for maximum and minimum temperatures by mixing the proper dyes selecting those which do not react chemically with each other and thereby change their characteristics under conditions of use. This mixture produces an indicator of a color different from either of its constituents. I find that when such a mixture is heated each constitutent acts as though the other were not present. One dye will change and disappear at a definite temperature, leaving the other dye as unchanged and bright as though it had been applied by itself. If, for example, a mixture of spirit scarlet and Chemco blue is applied to the button 5 and the lamp is heated the scarlet disappears completely at about 280° C., leaving the button as vivid a blue as though the blue were the only dye that had been applied to it until the button attains a temperature of about 310° C. whereupon the blue disappears. In this particular case a blue button 5 shows that the lamp was heated above 280° C. and below 310° C. In the same way a mixture of malachite green, which becomes colorless at about 220° C., and auramine yellow, which changes at about 250° C. can be used to make sure that the lamp has been heated to between 220° C. and 250° C. Similar mixtures which I have used successfully are methyl violet and Chemco blue for temperature ranges from 250° C. and 310° C., and Chemco red and Chemco blue for temperature ranges from 280° C. to 310° C. The latter mixture is particularly useful for lamps which should be heated quite hot during exhaust, as a blue color of the button or other part on which the mixture is used shows that the lamp has been heated to the proper temperature but has not been overheated.

In some type of lamps such as that shown in Figure 2, there is very little glass in the interior of the lamp, as the filament 11 is carried by the leading-in wires 12. In this type of lamp the temperature attained by the metal parts, such as the leads 12, is significant, and in accordance with my invention the indicator may be applied to the leads, as at the point 13 in the same way as applied to the glass parts of the lamp shown in Figure 1.

By my invention I obtain an article such as an incandescent lamp which is novel in that it contains as an integral part a permanent easily visible record of whether it was heated to the proper temperature during manufacture. Such an article is of great value as compared with the same kind of articles which contain no such record.

I have obtained the best results with the dyes above described, but many other dyes and coloring materials can be used in practicing my invention.

What I claim as new and desire to secure by Letters Patent of the United States, is:

1. The method of obtaining a permanent visible indication that a part of an incandescent lamp or similar current consuming device comprising a sealed glass envelope containing said part attained during manufacture of the device a predetermined temperature higher than said part attains during operation of said device, which consists in depositing on said part a colored material which permanently changes in color when said part attains said predetermined temperature.

2. The method which consists in applying to an interior part of an incandescent lamp or similar current consuming device comprising a sealed glass envelope a temperature responsive organic dye which permanently changes in color when said part attains a predetermined temperature higher than 150° C.

3. The method which consists in coating an interior part of an incandescent lamp or similar current consuming device comprising an evacuated glass envelope with a temperature responsive organic dye which changes color permanently when said part attains during the exhaust of said device a predetermined temperature lower than 325° C. but higher than the temperature attained by said part during operation of said device.

4. The method which consists in coating an interior part of an incandescent lamp or similar device comprising a sealed glass envelope containing said part with a mixture of temperature responsive dyes which are inert to each other and which permanently change color at predetermined and different temperatures between 150° C. and 325° C.

5. An incandescent lamp or similar device for translating electric current comprising a sealed envelope and having inside said envelope a temperature responsive material capable of permanently changing in color at a temperature higher than 150° C.

6. An incandescent lamp or similar device comprising a sealed glass envelope containing a metal filament and having on a part in the interior of the device a temperature sensitive organic dye unchanged in color at 150° C. but permanently changed in color at a higher temperature between 150° C. and 325° C.

7. An incandescent lamp or similar device comprising a sealed glass envelope and having on an interior part inside said envelope a coating comprising a mixture of two temperature sensitive dyes which are inert with respect to each other and both unchanged in color at 150° C., one permanently changing in color at a higher temperature and the other at a still higher temperature not exceeding 325° C.

8. An incandescent lamp comprising a sealed container, a metal filament therein, and an organic dye of the aromatic or benzene ring series which changes color permanently between 150° C. and 325° C. placed in said container adjacent said filament and exposed to the atmosphere in the bulb.

9. An incandescent lamp comprising a sealed container containing a filament and having adjacent said filament and exposed to the atmosphere in said container a mixture of two organic dyes of the aromatic or benzene ring series which are chemically inert to each other and which change color permanently at different temperatures within a range of 150° C. to 325° C.

In witness whereof, I have hereunto set my hand this 16th day of January, 1922.

CARL T. FULLER.